United States Patent
Rotondo

(10) Patent No.: US 7,805,278 B1
(45) Date of Patent: Sep. 28, 2010

(54) OPTIMAL SAMPLING SYSTEM ON POPULATIONS OF COLLECTIVES

(75) Inventor: John Rotondo, Murray Hill, NJ (US)

(73) Assignee: AT&T Intellectual Property II, LP, New York, NY (US)

( * ) Notice: Subject to any disclaimer, the term of this patent is extended or adjusted under 35 U.S.C. 154(b) by 470 days.

(21) Appl. No.: 11/564,497

(22) Filed: Nov. 29, 2006

(51) Int. Cl.
*G06F 19/00* (2006.01)

(52) U.S. Cl. .................................... 702/179; 235/386

(58) Field of Classification Search ................ 702/179, 702/182–185; 705/1
See application file for complete search history.

(56) References Cited

U.S. PATENT DOCUMENTS 7,172,118 B2 *  2/2007  Urken ........................ 235/386
2002/0046096 A1 *  4/2002  Srinivasan et al. ............ 705/14

\* cited by examiner

*Primary Examiner*—Edward Raymond

(57) ABSTRACT

A system and method for generating and implementing a sampling plan on populations of collectives involve implementing a 2-stage sampling process. Based on an analysis of at least one of historical data and user-defined data, the system generates a sampling plan by determining the number n of collectives to sample from a population of collectives and an optimal number m of members to sample from each collective of the n sampled collectives. The system then in two stages randomly samples n collectives and then randomly samples m members from each randomly sampled collectives.

9 Claims, 9 Drawing Sheets

FIG. 7 HIGH VS. LOW RELIABILITY DISTRIBUTIONS OF FIRM SAMPLE MEANS

OPTIMAL SAMPLING SYSTEM ON POPULATIONS OF COLLECTIVES

BACKGROUND OF THE INVENTION

1. Field of the Invention

The present invention relates to sampling data and more specifically to a system and method of generating and implementing an optimal sampling plan for data contained in populations of collectives for purposes such as opinion research.

2. Introduction

In many market or opinion research applications, one goal is to make statistically valid statements about the distribution of some opinion measure or other type of measurement in the population under study. Sometimes the population under study consists of individual entities each of which may be itself a collective having multiple members. For example, the population under study might consist of business firms, each of which may be viewed as a collective consisting of all the firm's employees (or some subset of employees of particular interest, e.g., those whose job function is in the Information Technology category). Other examples include populations of schools, households, churches, counties, and other public or private institutions. Within a collective there is typically some variability of opinion among its members. Despite the variability of opinion usually found within a collective, collectives are frequently assigned a single summary number that is representative in some sense of the opinions of the collective's relevant members, e.g., the average rating. This simplifies the task making valid statements about the distribution of opinion across all the collectives in the population under study or comparing distributions from different populations, which is often the main goal of the research. If not all of the relevant members of a collective are sampled, there is likely to be some degree of error in the summary measure calculated for that collective (within-collective sampling error).

Similarly, if not all collectives are sampled, there will be some error in estimating the characteristics of the distribution of the summary measure over collectives (between-collective sampling error), even if the summary measure calculated on each sampled collective were free of error. What is needed is a sampling procedure and associated procedures for statistical inference that take into account both within-collective sampling error and between-collective sampling error and make optimal tradeoffs between the two sources of error.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

The present invention addresses the deficiencies in the art by providing a system and method for optimal sampling of populations of collectives and for performing associated procedures for statistical inferences from the optimal sampling. The method embodiment relates to generating a sampling plan for a population of collectives. The method comprises, based on an analysis of at least one of historical data and user-defined data, generating a sampling plan by determining an optimal number m of collectives to sample from a population of collectives and an optimal number n of members to sample from each collective of the m collectives. Based on the plan, the system randomly samples m collectives and randomly samples n members from each randomly sampled collective. The generated sampling plan will minimize various alternative estimation error variances and meet statistical precision requirements. For example, the user may input particular requirements for the generated plan and such requirements, as well as historical data on previous surveys or other data, may be utilized in generating the plan.

The system embodiment comprises a group of modules configured to perform the steps of estimating historical parameters, generating an optimal sampling plan, implementing the optimal sampling plan and performing a statistical analysis of the results of the sampling. This sampling system may be characterized as a 2-stage sampling system in that one stage involves randomly sampling collectives and a second stage involves randomly sampling members of the collectives.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
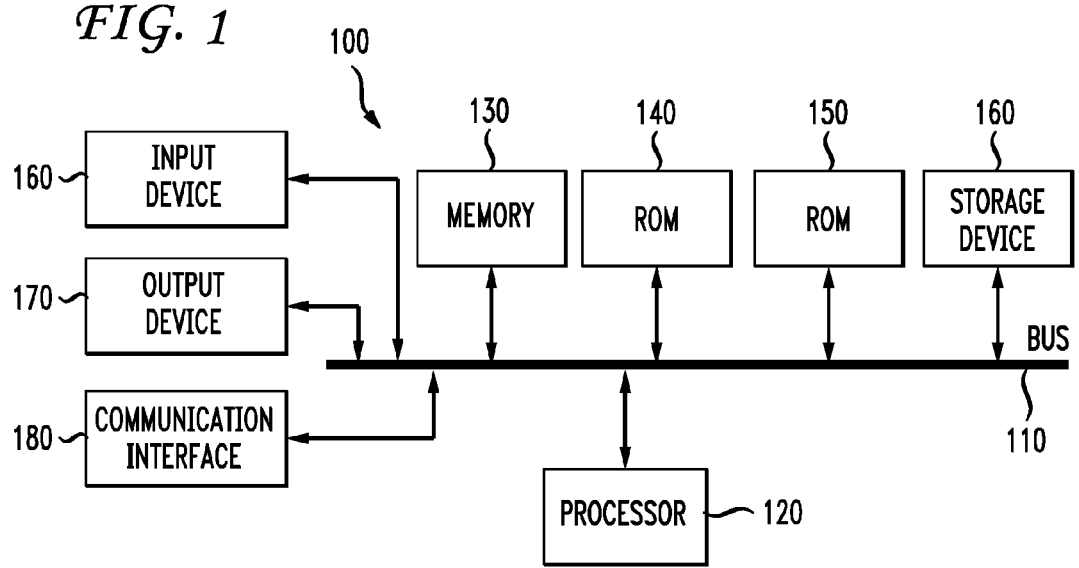
FIG. 1 illustrates a system embodiment of the invention.

We first introduce the basic components of a system embodiment. With reference to FIG. 1, an exemplary system for implementing the invention includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS), containing the basic routine that helps to transfer information between elements within the computing device 100, such as during start-up, is typically stored in ROM 140. The computing device 100 further includes storage means such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output means. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

The invention described herein addresses the statistical problem discussed above. An aspect of the invention relates to a system for optimal sampling of populations of collectives and for performing associated procedures for statistical inference on the resulting data. Specifically, the system determines the optimal number, m, of members to sample from each sampled collective and the total number, n, of collectives to sample in order to minimize various alternative estimation error variances and to meet specified statistical precision requirements. The sampling procedure is then carried out in 2 stages. In the first stage, n collectives are randomly sampled (with replacement) from the population of interest. In the second stage, m members are randomly sampled (with replacement) from each collective sampled in the first stage. The sampling may also occur without replacement. The 2-stage sampling procedure is carried out on each elementary design cell of the overall sampling design of the study. The measurements taken on sampled members of sampled collectives in each design cell are then analyzed with statistical procedures developed specifically for use with the 2-stage sampling method and its underlying model. These include procedures for parameter estimation, hypothesis testing and construction of confidence intervals. The main ideas of the theory and some key results on optimality are outlined below with details regarding parameter estimation, hypothesis testing and construction of confidence intervals. The methods described herein are presented in terms of a business customer satisfaction measurement application, but are more broadly applicable, as discussed above. An exemplary system based on the above procedures consists of 4 modules: 1) Historical Parameter Estimation; 2) Optimal Sampling Planning; 3) Optimal Sampling; and 4) Statistical Analysis.

Figure 2A:
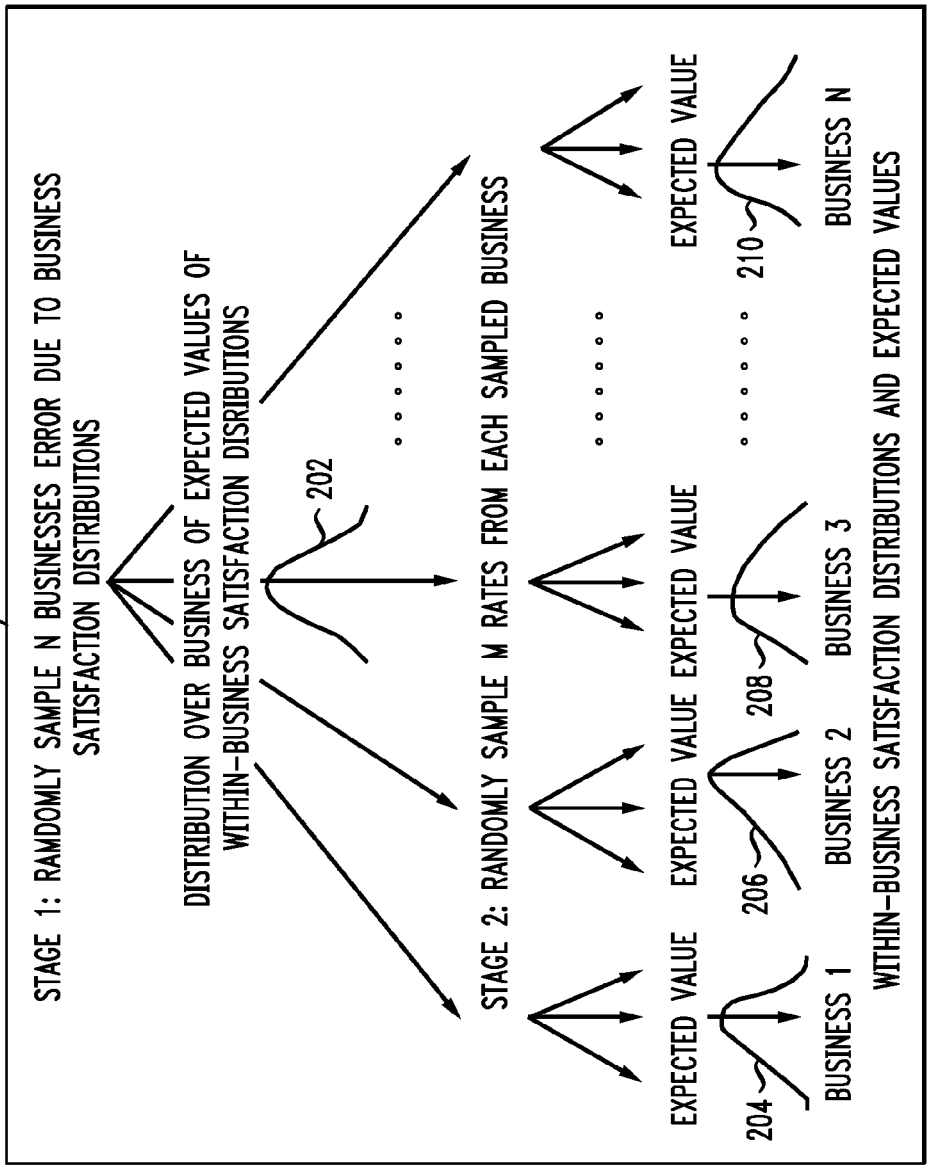
FIG. 2A illustrates a schematic of the 2-stage sampling concept.

FIG. 2A illustrates a 2-stage sampling theory schematic 200. The examples herein are provided in the context of businesses but the populations may be anything and are certainly not limited to business. In FIG. 2A, the distribution over businesses of expected values of within-business satisfaction distributions 202. This is shown as part of stage 1. In the stage 2, the process involves randomly sampling m raters from each sampled business. Errors in this stage are due to within-business rater sampling variability. The various businesses are shown as business 204, 206, 208 and 210. The 2-stage sampling theory provides a statistical framework which accommodates (but does not mandate) multiple respondents from each sampled firm. The theory recognizes and formally incorporates within-firm variability in ratings from potential respondents and provides a more realistic and more informative description of the sampling situation and measurement issues. The system enables the designer to solve for the optimal number of respondents to sample from each sampled firm in accordance with various statistical optimality criteria.

Figure 2B:
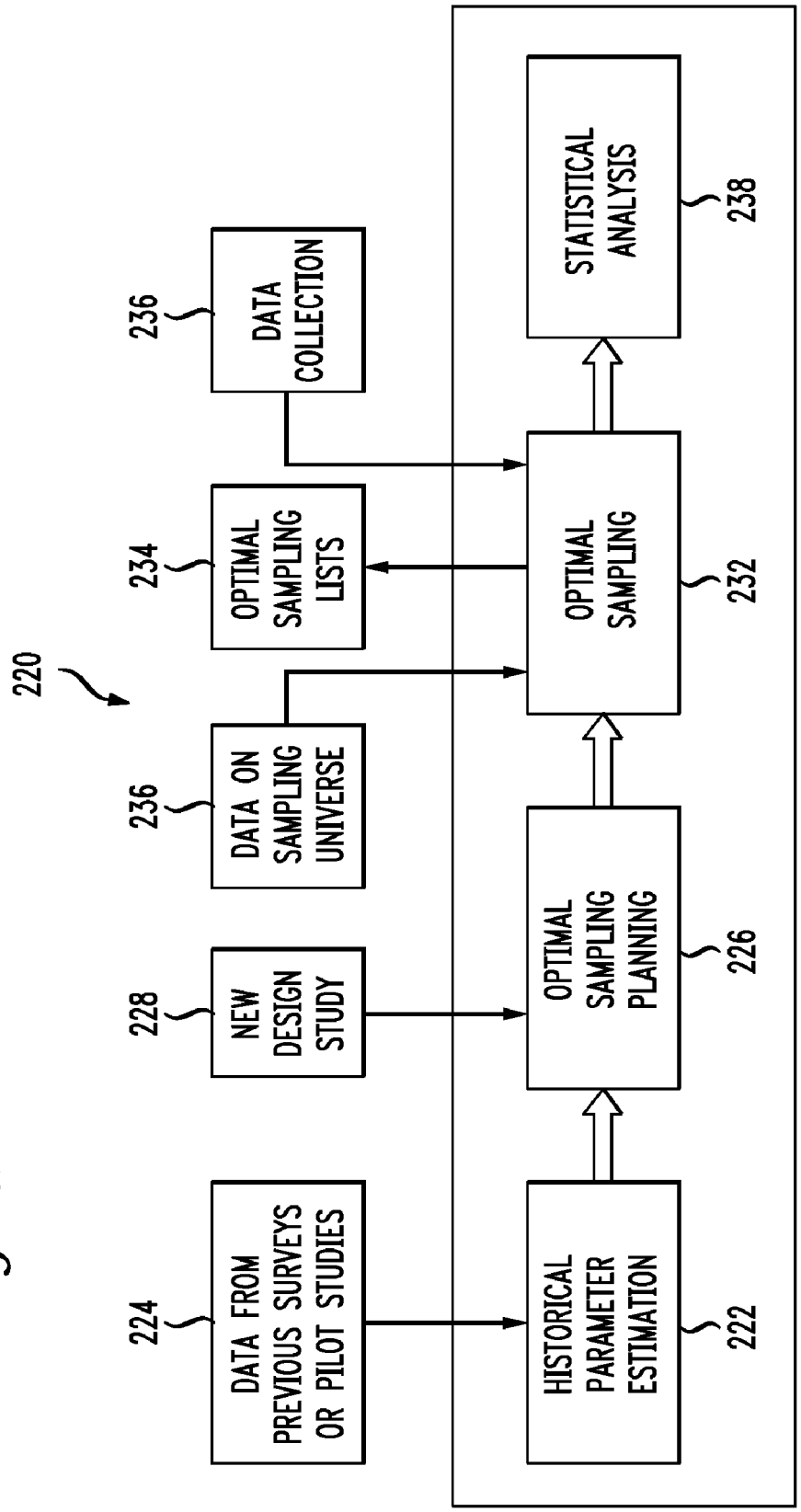
FIG. 2B illustrates a block diagram of several of the modules associated with the concept.

FIG. 2B illustrates various modules 220 that may be implemented on a computing device or computing devices to practice aspects of the invention. These modules may be programmed using any programming language. The first module is the historical parameter estimation module 222. As the name implies, this module utilizes various types of historical data. Data from previous surveys or pilot studies 224 is input to the historical parameter estimation module 222 which estimates key sampling parameters $\tau$, $\sigma^2$, and $\theta^2$ (discussed more below) for each design cell of the input study data. A design cell is any designer-defined population of collectives. In accordance with the first stage of the 2-stage sampling procedure, a random sample is drawn from the population of collectives defined by the design cell. This is followed by the second stage of sampling in which a random sample is drawn from each collective sampled in stage 1. A measurement on some variable is made on each sampled member of each sampled collective. The resulting set of sets of measurements constitutes the input study data for a given design cell. The collection of data sets from all design cells constitutes the input study data. These data sets are passed and made available to the next module, the optimal sampling planning module 226.

The designer enters the new study design (factors, factor levels and their full or incomplete crossings) 228 into the optimal sampling panning module 226 and inputs a mapping between the historical sampling parameters and new design. The designer enters statistical precision requirements (confidence level and parameter tolerances) and selects an optimality criterion. The optimal sampling planning module 226 then generates an optimal sampling plan (more information below) and passes the design and associated sampling plan to the optimal sampling module 232.

The optimal sampling module 232 generates optimal sampling lists 234 which are used to receive input data 236 on the sampling universe which may include name/identifiers of the collectives in the population, names/identifiers/contact information on the relevant members of each collective, and variable values relevant to assignment of collectives to design cells. For each design cell, the module 232 selects a random sample of collectives and a random sample of the members of the sampled collectives of the sizes required by the optimal sampling plan. Over-sampling to compensate for anticipated non-response rates is an optional feature. The module 232 generates the lists of collectives and members to be contacted/measured for each design cell in the data collection phase of the study along with sample size control parameters. This information is transferred to a separate data collection system/operation 236. Data/measurements collected on the samples is transferred back to the optimal sampling module 236 which organizes it into the appropriate design cells and passes the entire data structure to the statistical analysis module 238.

The statistical analysis module 238 performs parameter estimation, hypothesis testing and construction of confidence intervals on the data structure received from the optimal sampling module 232.

One aspect of the invention relates to a system for optimal sampling of populations of collectives and for performing associated procedures for statistical inference on the resulting data. Specifically, the system determines the optimal number, m, of members to sample from each sampled collective and the total number, n, of collectives to sample in order to minimize various alternative estimation error variances and to meet specified statistical precision requirements. The sampling procedure is then carried out in 2 stages. In the first stage, n collectives are randomly sampled, with replacement, from the population of interest. In the second stage, m members are randomly sampled, also with replacement, from each collective sampled in the first stage. The 2-stage sampling procedure is carried out on each elementary design cell of the overall sampling design of the study. The measurements taken on sampled members of sampled collectives in each design cell are then analyzed with statistical procedures developed for application with the principles of the invention and specifically for use with the 2-stage sampling method and its underlying model. These include procedures for parameter estimation, hypothesis testing and construction of confidence intervals.

This disclosure provides a more realistic characterization and treatment of the sampling and measurement issues involved in opinion/market research on populations of collectives. The concept accommodates multiple (randomly sampled) observations within each sampled collectives but does not mandate them. The underlying theory recognizes and formally incorporates within-collective variability of opinion, or other variable of interest, and the consequent variability in summary measure (such as the average opinion) which is taken to be representative of collective as a whole. The method enables decomposition of the total variance in the observed summary measure over collectives into a part attributable to average within-collective measurement error and a part attributable to between-collective variability in the latent true (error-free) values of the summary variable over the population of collectives.

One aspect of the invention is that it enables the study designer to choose among alternative sampling optimality criteria depending on which parameters are most important for the proposes of the study. For a given choice of an optimality criterion, the system automatically determines the optimal number, m, of observations to sample from each collective and the number, n, of collective to sample in order to meet user designer-specified statistical precision requirements. An example of such requirements may be related to error tolerances on parameter estimates and confidence level.

Figure 3:
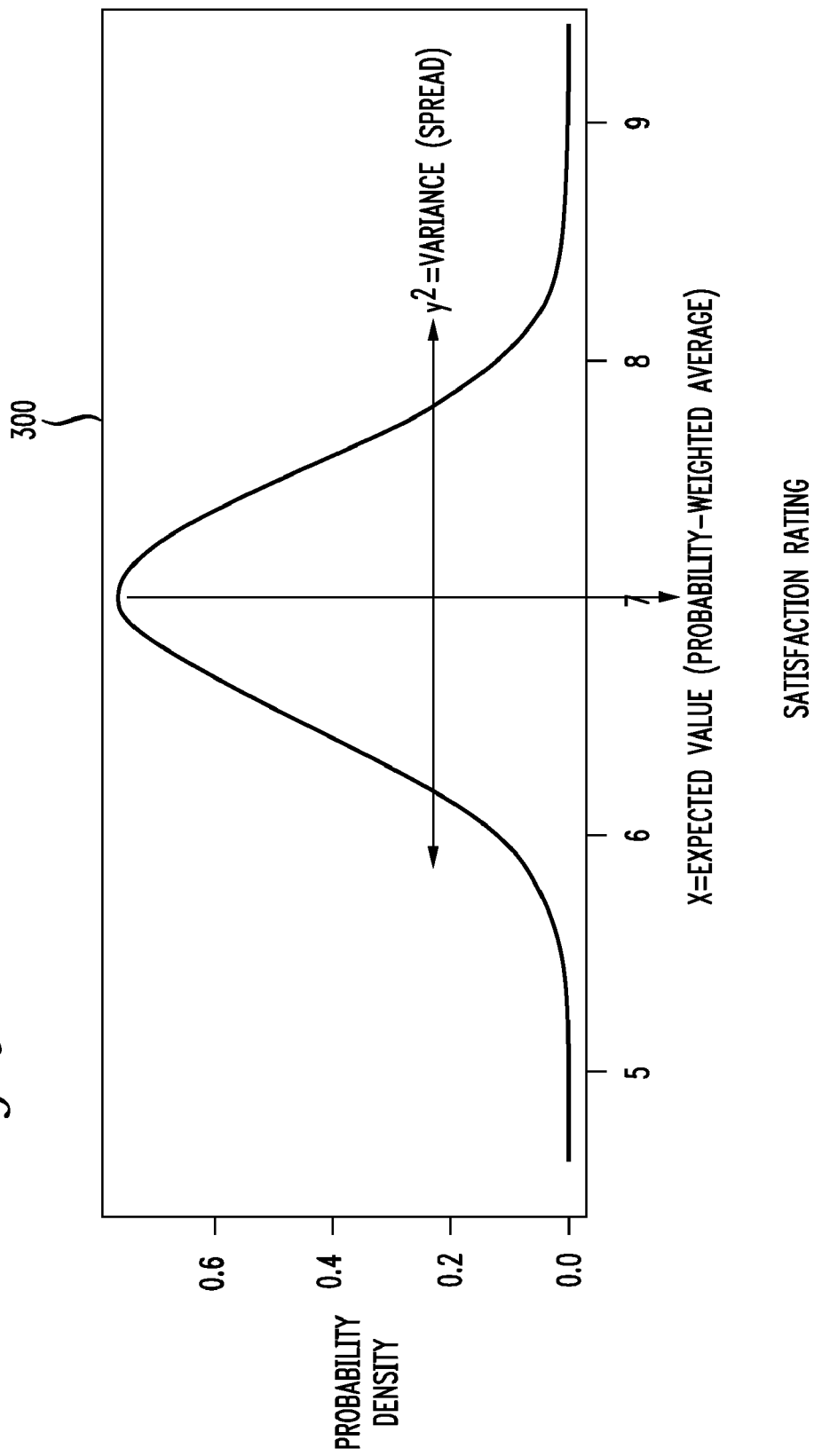
FIG. 3 illustrates a distribution of satisfaction within a particular firm.

FIG. 3 illustrates the probability density and satisfaction rating 300. Within a firm, there is typically some variability of opinion within the total pool of "qualified" potential respondents. Given this variability, the users of the system may determine a theoretical measure of "the firm's satisfaction." In one aspect of the 2-stage theory, administrators can use the expected value of the within-firm satisfaction distribution as the measure of the firm's satisfaction. This can be of course variable.

Figure 4:
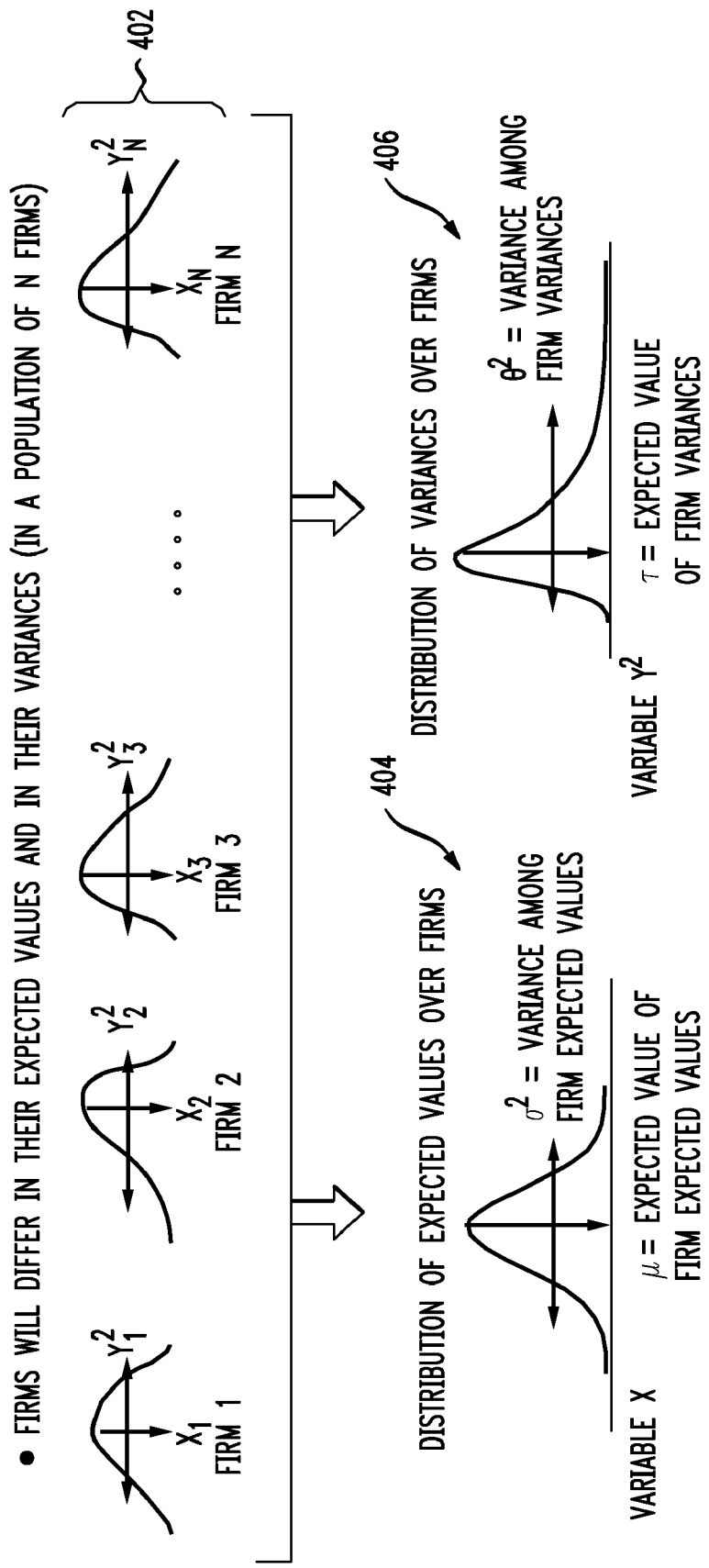
FIG. 4 illustrates a distribution of expected values and variances over firms.

FIG. 4 illustrates distributions of expected values and variances across firms. Distributions 402 represent various firms with different expected variances and their variances within the population of firms. Feature 404 represents the distribution of expected values over firms based on variable X and feature 406 illustrates the distribution of variances of the firms for variable $Y^2$.

Figure 5:
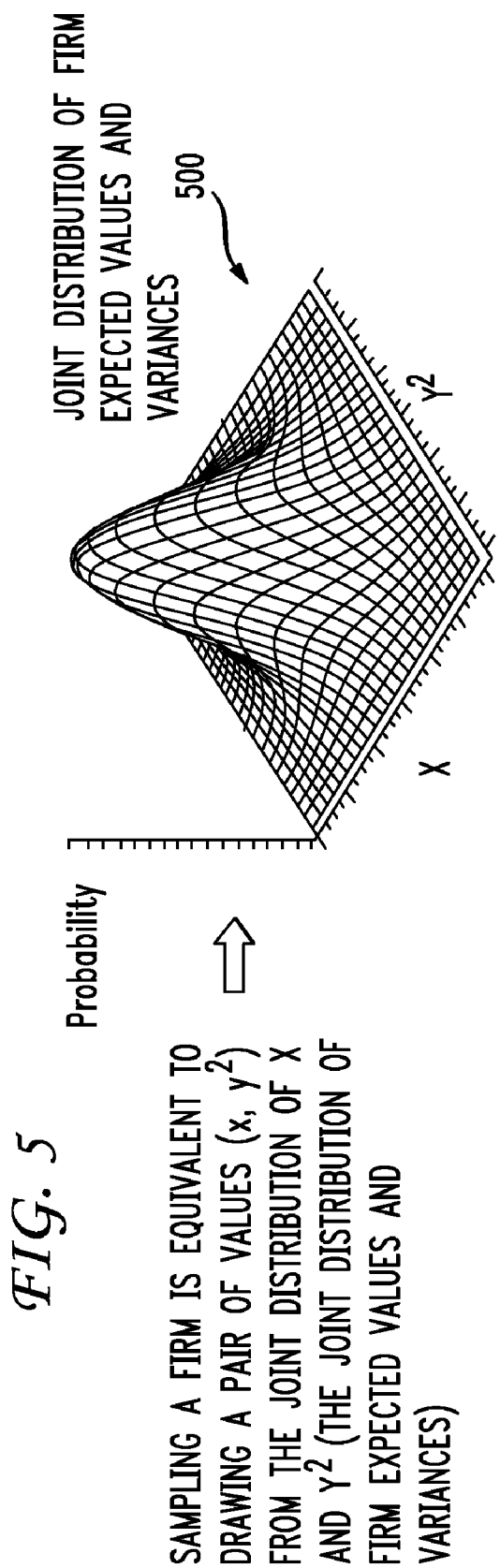
FIG. 5 illustrates a joint distribution of firm expected values and variances.

FIG. 5 shows a sampling of a firm and how it is equivalent to drawing a parity of values $(x,y^2)$ from the joint distribution of X and $Y^2$ which represents the joint distribution of firm expected values and variances 500.

Figure 6:
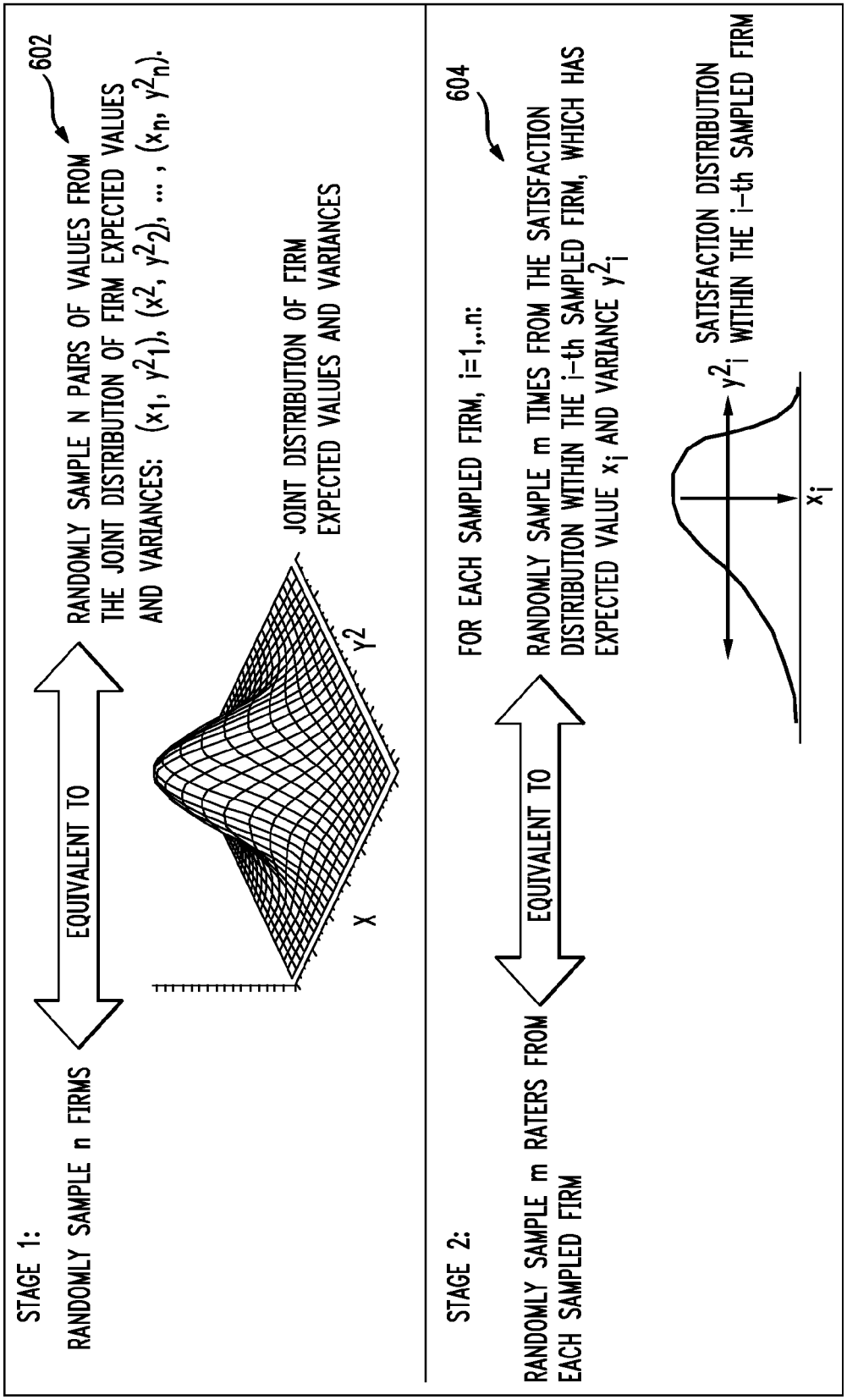
FIG. 6 illustrates the stage 1 and stage 2 random sampling.

FIG. 6 illustrates an example of the 2-stage sampling reduction performed as an aspect of the invention. In stage 1, the system randomly samples n firms. This may be equated to randomly sample n pairs of values from the joint distribution of firm expected values and variances: $(x_1, y^2{}_1), \ldots (x_2, y^2{}_2), \ldots (x_n, y^2{}_n)$ 602. In stage 2, the sampling involves randomly sampling m raters from each sampled firm, which may be characterized as for each sampled firm, $i=1, \ldots n$: the system randomly sample m times from the satisfaction distribution within the i-th sampled firm, which has expected value $x_1$ and variance $y^2{}_1$.

As part of this process, the system will perform an interpretation and estimation of various parameters. The following table 1 illustrates various parameters, their definition, interpretation and an unbiased estimator.

TABLE 1

Interpretation and Estimates of Parameters

| | Definition | Interpretation | Unbiased Estimator | |
|---|---|---|---|---|
| $X_i$ | Expected value of the satisfaction distribution within the i-th sampled firm | True value of firm satisfaction for the i-th sampled firm | $Z_{ij}$ = rating of j-th sampled respondent in i-th sampled firm $$\hat{X}_i = \frac{1}{m}\sum_{i=1}^{m} Z_{ij}$$ | (sample mean in i-th sampled firm) |

TABLE 1-continued

Interpretation and Estimates of Parameters

| | Definition | Interpretation | Unbiased Estimator | |
|---|---|---|---|---|
| $Y_i^2$ | Variance of the satisfaction distribution within the i-th sampled firm | True within-firm variability of satisfaction in the i-th sampled firm | $\hat{Y}_i^2 = \frac{1}{m-1}\sum_{i=1}^{m}(Z_{ij} - \hat{X}_i)^2$ | (sample variance in i-th sampled firm) |
| $\mu$ | Expected value of the distribution of firm expected values | True "average" of firm satisfaction (over all firms) | $\hat{\mu} = \frac{1}{n}\sum_{i=1}^{n}\hat{X}_i$ | (average of firm sample means) |
| $\tau$ | Expected value of the distribution of within-firm variances | True "average" of within-firm variation in satisfaction (over all firms) | $\hat{\tau} = \frac{1}{n}\sum_{i=1}^{n}\hat{Y}_i^2$ | (average of firm sample variances) |
| $\sigma^2$ | Variance of the distribution of firm expected values | True between-firm variation in firm satisfaction | $s^2 = \frac{1}{(n-1)}\sum_{i=1}^{n}(\hat{X}_i - \hat{\mu})^2$ $\hat{\sigma}^2 = s^2 - \frac{\hat{\tau}}{m}$ | (sample variance among firm sample means) |
| $\theta^2$ | Variance of the distribution of within-firm variances | True between-firm variability in within-firm variance | $w^2 = \frac{1}{(n-1)}\sum_{i=1}^{n}(\hat{Y}_i^2 - \hat{\tau})^2$ $\hat{\theta}^2 = \frac{(n(m-1)+2)}{n(m+1)}w^2 - \frac{2}{(m+1)}\hat{\tau}^2$ | (sample variance among firm sample variances) |

Reliability is a measure of how well the variance among the firm sample means matches the true variance in firm satisfaction. The preferred measure of reliability is based on a decomposition of the variance of the distribution of firm sample means into two parts: A part attributable to true between-firm variance in firm satisfaction (variance of firm expected values) and a part attributable to average error variance in measuring firm satisfaction (due to within-firm variation). The variance of the distribution of a firm sample mean is given by:

$$Var(\hat{X}) = \sigma^2 + \frac{\tau}{m}$$

where $\sigma^2$ refers to the true between-firm variance in firm satisfaction and $\tau/m$ is the average error variance in measuring firm satisfaction which may depend on m, the number of raters per firm.

The system preferably defines the reliability measure as:

$$R = \frac{\sigma^2}{\sigma^2 + \frac{\tau}{m}} \Longleftrightarrow R = \frac{m}{m + \frac{\tau}{\sigma^2}} \quad 0 < R < 1$$

In sum, reliability is the proportion of the variance of the distribution of firm samples means that is due to true between variance in firm satisfaction.

Next is provided example reliability calculations. We define reliability as:

$$R = \frac{m}{m + \frac{\tau}{\sigma^2}}$$

$$\frac{\tau}{\sigma^2} = \frac{\text{expected within-firm variation}}{\text{between-firm variation}}$$

Figure 7:
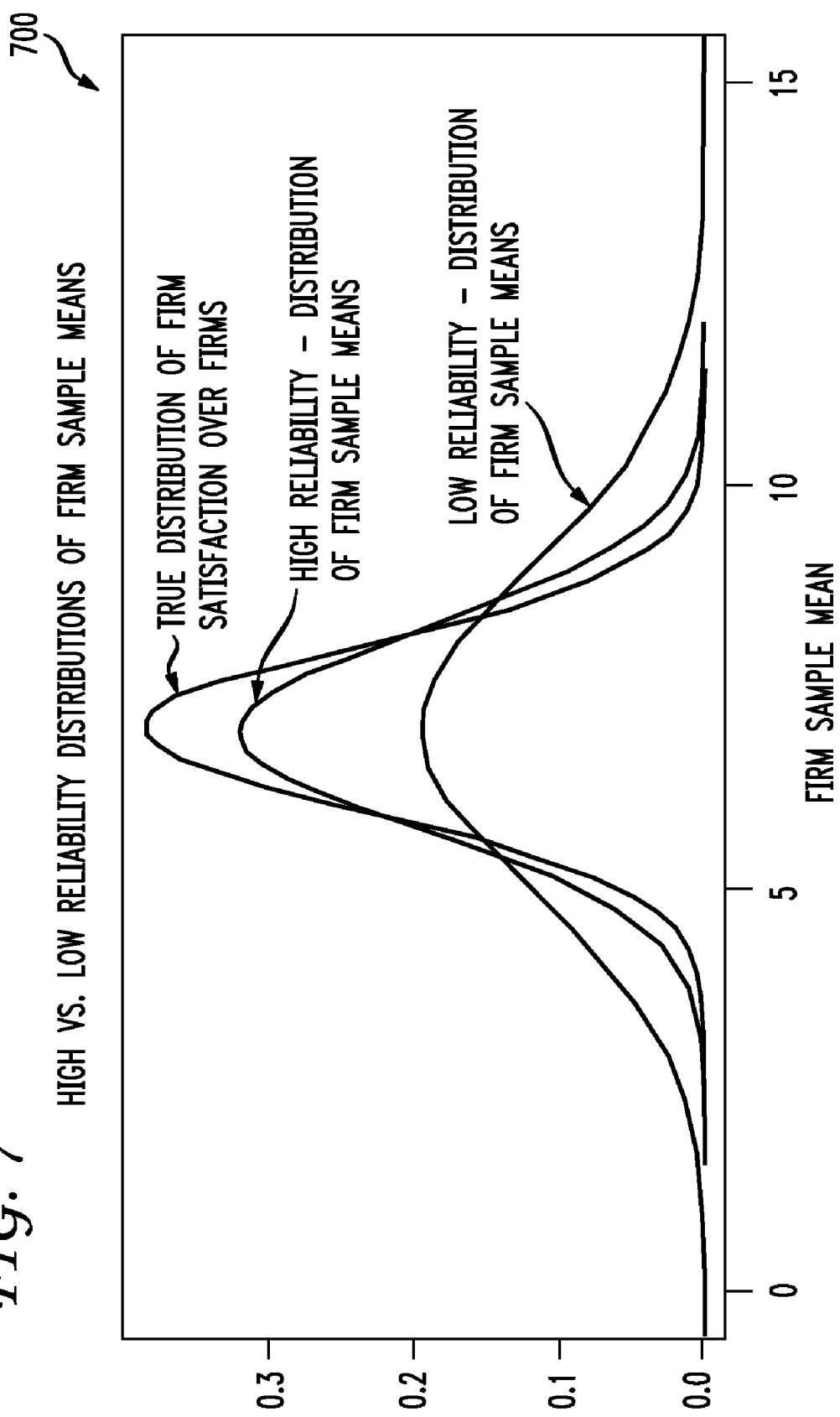
FIG. 7 illustrates high versus low reliability distributions of firm sample means.

FIG. 7 illustrates the high versus low reliability distributions 700 of firm sample means.

The following tables illustrate the various calculations:

TABLE 2

| Assume $\frac{\tau}{\sigma^2} = 2$ | | Assume $\frac{\tau}{\sigma^2} = 1$ | | Assume $\frac{\tau}{\sigma^2} = .5$ | |
|---|---|---|---|---|---|
| m | R | m | R | m | R |
| 1 | .33 | 1 | .50 | 1 | .67 |
| 2 | .50 | 2 | .67 | 2 | .80 |
| 3 | .60 | 3 | .75 | 3 | .86 |
| 4 | .67 | 4 | .80 | 4 | .89 |
| 5 | .71 | 5 | .83 | 5 | .91 |

Table 3 illustrates the optimal choice of a number of raters per firm (m) under each of several choices of a statistical optimality criterion:

TABLE 3

Optimal Choice of Number of Raters Per Firm (m)

| Optimality Criteria | Optimal m | Advantages | Disadvantages |
|---|---|---|---|
| 1. Minimize Variance of $\hat{\mu}$ | $m = 1$ | 1. Narrowest confidence intervals and highest power tests on $\mu$ (true average sat over all firms) for any fixed total sample size<br>2. Smallest total sample sizes (nm) | 1. Complete inability to estimate within-firm variability or to estimate the true between-firm variance (can't estimate $Y_i^2, \tau, \sigma^2, \theta^2$) |
| 2. Minimize Variance of $\hat{\tau}$ | $m = \dfrac{2\dfrac{\tau^2}{\theta^2} + 1}{\left(2 + 2\dfrac{\tau^2}{\theta^2}\right)^{\frac{1}{2}} - 1}$ | 1. Can estimate $Y_i^2, \tau, \sigma^2, \theta^2$<br>2. Narrowest confidence intervals and highest power tests on $\tau$ (true average within-firm variance) for any fixed total sample size | 1. Larger total sample sizes needed if precision in estimating $\mu$ is to be maintained (relative to Criterion 1) |
| 3. Minimize (Variance of $\hat{\mu}$ + Variance of $\hat{\tau}$) | $m = \dfrac{2\dfrac{(\theta^2 + \tau^2)}{(\theta^2 + \sigma^2)} - 1}{\left(2\dfrac{(\theta^2 + \tau^2)}{(\theta^2 + \sigma^2)}\right)^{\frac{1}{2}} - 1}$ | 1. Can estimate $Y_i^2, \tau, \sigma^2, \theta^2$<br>2. Smaller total sample sizes than those required by Criterion 2<br>3. Better precision on $\mu$ than Crit. 2 for same total sample | 1. Larger total sample sizes needed if precision in estimating $\mu$ is to be maintained (relative to Criterion 1)<br>2. Larger total sample size to maintain precision on $\tau$ relative to Criterion 2 |
| 4. Achieve a user-specified Reliability (R) $0 < R < 1$ | $m = \dfrac{\tau}{\sigma^2} \dfrac{R}{(1 - R)}$ | 1. Can estimate $Y_i^2, \tau, \sigma^2, \theta^2$<br>2. Allows user to control the degree to which variance among firm sample means approaches true between-firm variance | 1. Specifying a high level of reliability, e.g., .95, may require an impractically large number of raters per firm for "typical" values of $\tau$ and $\sigma^2$ |

In the cases of optimality criteria 1-3, the general approach to determining the optimal value of m (the number of respondents to sample from each firm/collective) is the same. An expression for the theoretical variance of the estimate of the parameter of interest is derived. It is assumed that total sample (S=mn) is fixed, so that the variance is a function only of m (or n). Standard analytic methods are used to find the value of m (or n) that minimizes the theoretical variance of interest. For optimality criterion 1, the theoretical variance is found to be a strictly increasing linear function of m. So, the solution in that case is to choose the smallest possible value of m, i.e., m=1. For optimality criteria 2 and 3, the m that minimizes the theoretical variances of interest are found to be quadratic functions of n. Therefore, the optimal m=S/n in those cases are found by solving an ordinary quadratic equation and choosing the unique solution (root) that lies between 1 and S (fixed total sample size). For optimality criterion 4, the reliability measure R is a simple invertible function of m, assuming again that total sample size S is fixed. Once the desired value of R is chosen, the solution is found by inverting the function, i.e., solve for m as a function of R.

Table 4 illustrates the required number of firms to sample (n), under each optimality criterion, in order to meet user-specified statistical precision requirements on the estimates of one or more parameters.

TABLE 4

Required Number of Firms to Sample (n)

| Optimality Criteria | Optimal m | Required n to achieve tolerance on $\mu$ only | Required n to achieve tolerance on $\tau$ only | Required n to achieve tolerances on $\mu$ and $\tau$ |
|---|---|---|---|---|
| 1. Minimize Variance of $\hat{\mu}$ | $m = 1$ | $n_\mu = \left(\sigma^2 + \dfrac{\tau}{m}\right)\left(\dfrac{\Phi^{-1}\left(1 - \dfrac{\alpha}{2}\right)}{t_\mu}\right)^2$ | Inapplicable: Cannot estimate $\tau$ when m = 1 | Inapplicable: Cannot estimate $\tau$ when m = 1 |
| 2. Minimize Variance of $\hat{\tau}$ | $m = \dfrac{2\dfrac{\tau^2}{\theta^2} + 1}{\left(2 + 2\dfrac{\tau^2}{\theta^2}\right)^{\frac{1}{2}} - 1}$ | $n_\mu = \left(\sigma^2 + \dfrac{\tau}{m}\right)\left(\dfrac{\Phi^{-1}\left(1 - \dfrac{\alpha}{2}\right)}{t_\mu}\right)^2$ | $n_\tau = \left(\theta^2 + 2\dfrac{(\theta^2 + \tau^2)}{(m-1)}\right)\left(\dfrac{\Phi^{-1}\left(1 - \dfrac{\alpha}{2}\right)}{t_\tau}\right)^2$ | $n = \max\{n_\mu, n_\tau\}$ |
| 3. Minimize (Variance of $\hat{\mu}$ + Variance of $\hat{\tau}$) | $m = \dfrac{2\dfrac{(\theta^2 + \tau^2)}{(\theta^2 + \sigma^2)} - 1}{\left(2\dfrac{(\theta^2 + \tau^2)}{(\theta^2 + \sigma^2)}\right)^{\frac{1}{2}} - 1}$ | $n_\mu = \left(\sigma^2 + \dfrac{\tau}{m}\right)\left(\dfrac{\Phi^{-1}\left(1 - \dfrac{\alpha}{2}\right)}{t_\mu}\right)^2$ | $n_\tau = \left(\theta^2 + 2\dfrac{(\theta^2 + \tau^2)}{(m-1)}\right)\left(\dfrac{\Phi^{-1}\left(1 - \dfrac{\alpha}{2}\right)}{t_\tau}\right)^2$ | $n = \max\{n_\mu, n_\tau\}$ |

TABLE 4-continued

Required Number of Firms to Sample (n)

| Optimality Criteria | Optimal m | Required n to achieve tolerance on µ only | Required n to achieve tolerance on τ only | Required n to achieve tolerances on µ and τ |
|---|---|---|---|---|
| 4. Achieve a user-specified Reliability (R) $0 < R < 1$ | $m = \dfrac{\tau}{\sigma^2} \dfrac{R}{(1-R)}$ | $n_\mu = \left(\sigma^2 + \dfrac{\tau}{m}\right)\left(\dfrac{\Phi^{-1}\left(1-\dfrac{\alpha}{2}\right)}{t_\mu}\right)^2$ | $n_\tau = \left(\theta^2 + 2\dfrac{(\theta^2+\tau^2)}{(m-1)}\right)\left(\dfrac{\Phi^{-1}\left(1-\dfrac{\alpha}{2}\right)}{t_\tau}\right)^2$ | $n = \max\{n_\mu, n_\tau\}$ |

Confidence Level = $1 - \alpha$
Tolerance on µ: $t_\mu = |\hat{\mu} - \mu|$
Tolerance on τ: $t_\tau = |\hat{\tau} - \tau|$
Inverse Normal cdf: $\Phi^{-1}$ It has already been discussed in connection with Table 3 how the optimal m is found for a given total sample S is fixed. Under the assumptions of the theory, it can be shown that the optimal value of m does not depend on S. Let m* denote the optimal value of m. The remaining issue is to choose n*=S/m* to meet statistical precision requirements on the parameter estimates. Table 4 shows the values of n needed to meet user-specified statistical precision requirements on the estimate of the parameter µ, or the estimate of the parameter τ, or both. The statistical precision of the parameter estimates is a strictly increasing invertible function of n*=S/m*. This function may be denoted as P(n*). The solutions shown in Table 4 are the results of inverting this function for a given user-specified value of P(n*). Given P(n*), the solution is n*=P$^{-1}$(n*) where P$^{-1}$ is the inverse of the function P. Let t(n*) be the achieved error tolerance for a parameter estimate, let $(1-\alpha)$ be a user-specified statistical confidence level, and let $z_{\alpha/2}=\Phi^{-1}(1-\alpha/2)$, where $\Phi^{-1}$ is the inverse standard normal cumulative distribution function. Then for the estimate of µ, the statistical precision function is $P(n^*)=t(n^*)=z_{\alpha/2}[Var(\hat{\mu})]^{1/2}$. For the estimate of τ, the statistical precision function is $P(n^*)=t(n^*)=z_{\alpha/2}[Var(\hat{\tau})]^{1/2}$. These functions are inverted in order to find the n* needed to achieve a user-specified error tolerance t.

Next we discuss the more details of the 2 stage sampling process as it relates to parameter estimation. The sample procedure as discussed above involves a stage 1 to randomly sample n businesses (with replacement) and a stage 2 involving sampling within $B_i$, i=1, n, where B denote the ith sampled business. The system randomly sample $m_i$ respondents from $B_i$ (with replacement), for i=1, n. There are various assumptions and random variables involves in this process. Let P be a population of N businesses indexed by k=1, ..., N (N large). Let $D_k$ be the distribution of the satisfaction measure within the total pool of potential respondents within business k=1, ..., N; Let $X_k \sim D_k$ be a random variable representing the satisfaction score of a respondent randomly drawn from business k, where $E(Z_k)=x_k$ and $Var(Z_k)=y^2_k$, for k=1, ..., N; We will take $x_k$ as our theoretical measure of the satisfaction of business k, k=1, ..., N. Sometimes $x_k$ is referred to as the "true" satisfaction score of business k; Let F be the distribution of values of $x_k$ for k=1, ... i.e., F is the distribution of true satisfaction scores in the population P of businesses; Let $X_i \sim F$ be a random variable representing the "true" satisfaction score of the i-th randomly sampled business, $B_i$, i=1, n, where $E(X_i)=\mu$, $Var(X_i)=\sigma^2$, and $X_1, X_2, \ldots, X_n$ are independent; Let G be the distribution of the values of $y^2_k$ for k=1, ... N, i.e., G is the distribution of the within-business variance in satisfaction over the population P of businesses; Let $Y^2_i \sim G$ be a random variable representing the within-business variance of the i-th sample business, $B_i$, i=1, ..., n, where $E(Y^2_i)=\tau$, $Var(Y^2_i)=\theta^2$, and $Y_{21}, Y_{22}, \ldots, Y_{2n}$ are independent; Let H be the joint distribution of $(X_i, Y^2_i)$, i=1, n; Let $Z_{ij}$ be a random variable representing the rating given by the jth sampled respondent, j=1, from the ith sampled business $B_i$, i=1, ..., n; Given $(X_i, Y^2_i)$, $Z_{i1}, Z_{i2}, \ldots, Z_{im_i}$ are independent and identically distributed with expected value $X_i$ and variance $Y^2_i$; Given $(X_i, Y^2)$, i=1, ... n, all $Z_{ij}$'s are mutually independent.

The following illustrates unbiased estimators:

Estimate of $x_i$, the "true" satisfaction score for the i-th sampled business $$\hat{X}_i = \frac{1}{m_i} \sum_{j=1}^{m_i} Z_{ij}$$

Estimate of $y^3_i$, the variance of satisfaction ratings in the ith sampled business $$\hat{Y}^2_i = \frac{1}{m_i - 1} \sum_{j=1}^{m_i} (Z_i - \hat{X}_i)^2$$

Estimate of the variance $\hat{X}_i$ $$Est. \, VAR(\hat{X}_i) = \frac{\hat{Y}^2_1}{m_i}$$

Estimate of µ, the expected value of the true satisfaction distribution F in the population P of businesses $$\hat{\mu} = \frac{1}{n} \sum_{i=1}^{u} \hat{X}_i$$

Theoretical variance of $\hat{\mu}$ $$VAR(\hat{\mu}) = \frac{\tau}{n^2} \left(\sum_{i=3}^{u} \frac{1}{m_i}\right) + \frac{\sigma^2}{n}$$

Need to find an unbiased estimator of VAR($\hat{\mu}$)

- Let $s^2 = \dfrac{\sum_{i=1}^{x} (\hat{X}_i - \hat{\mu})^2}{n-1}$

It can be shown that $$E(s^2) = \frac{\tau}{n}\left(\sum_{i=1}^{n} \frac{1}{m_i}\right) + \sigma^2$$

Consequently, an unbiased estimate of the variance of $\hat{\mu}$ is $$\text{Est. VAR}(\hat{\mu}) = \frac{s^2}{n}$$

A unbiased estimate of $\tau$, the expected value of the distribution G of within-business variance in satisfaction in the population P of businesses $$\hat{\tau} = \frac{1}{n}\sum_{i=1}^{x} \hat{Y}_i^2$$

Consequently, an unbiased estimate of $\sigma^2$ is $$\hat{\sigma}^2 = s^2 - \frac{\hat{\tau}}{n}\left(\sum_{i=1}^{n} \frac{1}{m_i}\right)$$

Next we discuss the distribution-dependent estimators. Estimates of certain quantities depend on 4th central moments of the distributions of the about which the inventors have made no distributional assumptions. To avoid introducing additional an random variable representing the arbitrary distribution of 4th central moments over the population of businesses, the inventors preferably assume that, conditionally on $X_i$ and $Y^2_i$, the $Z_{ij}$'s are approximately normal. This assumption will permit us to express 4th central moments of the $Z_{ij}$'s as functions of the first and second moments.

Theoretical variance of $$\hat{\tau} = \frac{1}{n}\sum_{i=1}^{n} \hat{Y}_i^2 \text{ is}$$

$$\text{VAR}(\hat{\tau}) = \frac{\theta^2}{n^2}\sum_{i=1}^{u}\left(1 + \frac{2}{m_i - 1}\right) + \frac{\tau^2}{n^2}\sum_{i=1}^{n}\left(\frac{2}{m_i - 1}\right)$$

Let $$w^2 = \frac{\sum_{i=1}^{\tau} (Y_i^2 - \hat{\tau})}{n-1}$$

An unbiased estimator of VAR($\hat{\tau}$) is $$\text{Est.VAR}(\hat{\tau}) = \frac{w^3}{n}$$

Using the results on VAR($\hat{\tau}$) and Est.VAR($\hat{\mu}$), we can construct an unbiased estimate of $\theta^2$ Recall that $$w^2 = \frac{\sum_{i=1}^{n} (\hat{Y}_i^2 - \hat{\tau})^2}{n-1} \text{ and } \hat{\tau} = \frac{\sum_{i=1}^{n} \hat{Y}_i^2}{n}$$

Then, an unbiased estimate of $\mu^2$ is $$\hat{\theta}^2 = \frac{\sum_{i=1}^{n}\left(\frac{2}{m_i - 1}\right)}{\left(n + \sum_{i=1}^{n}\left(\frac{2}{m_i - 1}\right)\right)}\left[\left(\frac{n}{\sum_{i=1}^{n}\left(\frac{2}{m_i - 1}\right)} + \frac{1}{n}\right)w^2 - (\hat{\tau})^2\right]$$

Next is discussed various features of the features of hypothesis testing and confidence intervals. These concepts relate to provides confidence intervals for the expected values of the satisfaction distributions. All hypothesis testing and confidence interval construction described herein is based on asymptotic normal distribution theory and appeal to the Central Limit Theorem (CLT). All parameter estimates in this invention have asymptotic normal distributions.

Single population (single design cell) test and confidence intervals are illustrated by calculating test statistics and confidence intervals for means under the 2 stage sampling theory. Let $Z_{ij}$ denote the satisfaction rating of the j-th sampled rater from the i-th sampled business, i=1, . . . , n and j=1, . . . , $m_i$. Then let:

$$\hat{X}_i = \frac{1}{m_i}\sum_{j=1}^{m_i} Z_{ij}$$

$$\hat{\mu} = \frac{1}{n}\sum_{i=1}^{n} \hat{X}_i$$

$$s^2 = \frac{\sum_{i=1}^{n} (\hat{X}_i - \hat{\mu})^2}{n-1}$$

Next is discussed the single population tests on true meaning satisfaction. The test statistic for testing $H_o: \mu = \mu_0$ vs. $H_a: \mu \neq \mu_0$ at $\alpha$ level of significance is as follows:

Reject $H_o$ if:

$$|z| = \left| \frac{\hat{\mu} - \mu_0}{\sqrt{s^2/n}} \right| > z_{\alpha/2}$$

where $z_{\alpha/2}$ is the value of a N(0,1) random variable z such that $P(z>z_{\alpha/2})=\alpha/2$ The test statistic for testing $H_o:\mu=\mu_0$ vs. $H_a:\mu>\mu_0$ at $\alpha$ level of significance is as follows:

Reject $H_o$ if:

$$z = \frac{\hat{\mu} - \mu_0}{\sqrt{s^2/n}} > z_\alpha$$

where $z_\alpha$ is the value of a N(0,1) random variable z such that $P(z>z_\alpha)=\alpha$.

A $(1-\alpha)$ confidence interval for $\mu$ is given by $$P\left(\hat{\mu} - z_{\alpha/2}\sqrt{s^2/n} \leq \mu \leq \hat{\mu} + z_{\alpha/2}\sqrt{s^2/n}\right) = 1 - \alpha$$

where $z_{\alpha/2}$ is the value of a N(0,1) random variable z such that $P(z>z_{\alpha/2})=\alpha/2$.

Next is discussed an example process of comparing two populations. Let Z1ij denote the satisfaction rating of the j-th sampled rater from the i-th sampled business in population 1, $i=1, \ldots, n_1$ and $j=1, \ldots, m_{1i}$. Let $Z_{2ij}$ denote the satisfaction rating of the j-th sampled rater from the i-th sampled business in population 2, $i=1, \ldots, n_2$ and $j=1, \ldots, m_{2i}$. Next, let:

$$\hat{X}_{1i} = \frac{1}{m_{1i}} \sum_{j=1}^{m_1} Z_{1i}$$

$$\hat{\mu}_1 = \frac{1}{n_1} \sum_{s=1}^{n_1} \hat{X}_{1i}$$

$$s_1^2 = \frac{\sum_{i=1}^{n_1} (\hat{X}_{1i} - \hat{\mu}_1)^2}{n_1 - 1}$$

$$\hat{X}_{2i} = \frac{1}{m_{1i}} \sum_{j=1}^{m_1} Z_{2i}$$

$$\hat{\mu}_2 = \frac{1}{n_2} \sum_{i=1}^{n_i} \hat{X}_{2i}$$

$$s_i^2 = \frac{\sum_{j=1}^{n_1} (\hat{X}_{2i} - \hat{\mu}_2)^2}{n_2 - 1}.$$

Next, an aspect of the invention relates to test statistics and confidence intervals for differences in mean satisfaction between two populations. Test statistic for testing $H_o:\mu_1-\mu_2=\delta$ vs. $H_a:\mu_1-\mu_2\neq\delta$ at the $\alpha$ level of significance:

Reject $H_o$ if:

$$|z| = \left| \frac{(\hat{\mu}_1 - \hat{\mu}_2) - \delta}{\sqrt{s_1^2/n_1 + s_2^2/n_2}} \right| > z_{\alpha/2}$$

Test statistic for testing $H_o:\mu_1-\mu_2=\delta$ vs. $H_a:\mu_1-\mu_2>\delta$ at the $\alpha$ level of significance may be as follows:

Reject $H_o$ if:

$$z = \frac{(\hat{\mu}_1 - \hat{\mu}_2) - \delta}{\sqrt{s_1^2/n_1 + s_2^2/n_2}} > z_\alpha$$

A $(1-\alpha)$ confidence interval for $\mu_1-\mu_2$:

$$P(\hat{\mu}_1-\hat{\mu}_2-z_{\alpha/2}\sqrt{s_1^2/n_1+s_2^2/n_2} \leq \mu_1-\mu_2 \leq \hat{\mu}_1-\hat{\mu}_2+z_{\alpha/2}\sqrt{s_1^2/n_1+s_2^2/n_2})=1-\alpha$$

Next is discussed multiple population designs, e.g. factorial designs. In these designs, one may want to test a hypothesis about a weighted average of some parameter of the satisfaction distribution over some subset of elementary design cells (populations) in a multiple population design. The weights used in combining cell means are problem-specific. Here, the inventors only assume that the weights are known constants that sum to one. Those of skill in the art recognize various ways to weigh data for various businesses and specifically for telecom business customer satisfaction data. The inventors also assume that the cells represent mutually exclusive populations and that observations in each design cell are independent of observations in all other cells.

Let $Z_{hij}$ be the satisfaction score of the j-th sampled rater in the j-th sampled business within the h-th design cell (h-th subpopulation), $j=1, \ldots, m_{hi}, i=1, \ldots, n_h$, and $h=1, \ldots, q$.

Let:

$$\hat{X}_{hi} = \frac{\sum_{j=1}^{m_{hi}} Z_{hij}}{m_{hi}}, \quad \hat{\mu}_{2i} = \frac{\sum_{i=1}^{z_j} \hat{X}_{hi}}{n_h} \text{ and } s_h^2 = \frac{\sum_{i=1}^{n} (\hat{X}_{hi} - \hat{\mu}_h)^2}{n_h - 1}$$

The following illustrates test on weighted expected satisfaction. Let $w_h \geq 0$ denote the weight associated with subpopulation/design cell h, for $h=1, \ldots, q$, where $$\sum_{h=1}^{q} w_h = 1$$

Let: $\hat{\mu} = \sum_{h=1}^{q} w_h \hat{\mu}_h$ and $\hat{\sigma}_\mu^2 = \sum_{h=1}^{q} w_h^2 \frac{s_h^2}{n_h}$ Discussed herein are tests for hypotheses about:

$$\mu = E(\hat{\mu}) = \sum_{h=1}^{q} w_h E(\hat{\mu}_h) = \sum_{h=1}^{q} w_h \mu_h$$

The test statistic for testing $H_o: \mu \neq \mu_0$ at $\alpha$ level of significance is as follows:

$$|z| = \left|\frac{\hat{\mu} - \mu_0}{\hat{\sigma}_{\hat{\mu}}}\right| > z_{\alpha/2}$$

Reject $H_o$ if:

The test statistic for testing $H_o: \mu = \mu_0$ vs. $H_a: \mu > \mu_0$ at $\alpha$ level of significance is as follows:

$$z = \frac{\hat{\mu} - \mu_0}{\hat{\sigma}_{\hat{\mu}}} > z_\alpha$$

Reject $H_o$. If:

Next, we discuss tests on weighted expected satisfaction. Let $w_h \geq 0$ denote the weight associated with subpopulation/design cell h, for h=1, ..., q, where $$\sum_{h=1}^{q} w_h = 1.$$

$$\hat{\mu} = \sum_{h=1}^{q} w_h \hat{\mu}_h \text{ and } \hat{\sigma}_{\hat{\mu}}^2 = \sum_{h=1}^{q} w_h^2 \frac{s_h^2}{n_h}$$

Let:
We next discuss tests for hypotheses about:

$$\mu = E(\hat{\mu}) = \sum_{h=1}^{q} w_h E(\hat{\mu}_h) = \sum_{h=1}^{q} w_h \mu_h$$

The test statistic for testing $H_o: \mu = \mu_0$ vs. $H_a: \mu \geq \mu_0$ at $\alpha$ level of significance may be as follows:
Reject $H_o$ if:

$$|z| = \left|\frac{\hat{\mu} - \mu_0}{\hat{\sigma}_{\hat{\mu}}}\right| > z_{\alpha/2}$$

The test statistic for testing $H_o: \mu = \mu_0$ vs. $H_a: \mu > \mu_0$ at $\alpha$ level of significance may be as follows:
Reject $H_o$ if:

$$z = \frac{\hat{\mu} - \mu_0}{\hat{\sigma}_{\hat{\mu}}} > z_\alpha$$

The confidence interval for weighted satisfaction is as follows. A $(1-\alpha)$ confidence interval for $$\mu = E(\hat{\mu}) = \sum_{h=1}^{q} w_h E(\hat{\mu}_h) = \sum_{h=1}^{q} w_h \mu_h$$

is given by: $P(\hat{\mu} - z_{\alpha/2} \hat{\sigma}_{\hat{\mu}} \leq \mu \leq \hat{\mu} + z_{\alpha/2} \hat{\sigma}_{\hat{\mu}}) = 1 - \alpha$
where:

$$\hat{\mu} = \sum_{h=1}^{q} w_h \hat{\mu}_h \text{ and } \hat{\sigma}_{\hat{\mu}}^2 = \sum_{h=1}^{q} w_h^2 \frac{s_h^2}{n_h}$$

When comparing two weighted averages of expected satisfaction, we can look at an example. Assume one wants to compare expected weighted mean satisfaction with AT&T over all products and segments with expected weighted mean satisfaction over all competitors (Verizon, Bell South etc.), products and segments. Let $C_1$ and $C_2$ denote two subsets of elementary design cells that have no cells in common, i.e., $C_1 \cap C_2$ is empty. Let $Z_{1hij}$ be the satisfaction score of the j-th sampled rater in the i-th sampled business within the h-th design cell (h-th subpopulation), j=1, ..., $m_{1hi}$, i=1, ..., $n_{1h}$, and let $Z_{2hij}$ be the satisfaction score of the j-th sampled rater in the i-th sampled business within the h-th design cell (h-th subpopulation), j=1, ..., $m_{2hi}$, i=1, ..., $n_{2h}$, and let $w_{1h} > 0$ be a weight associated with each design cell $h \in C_1$ such that $$\sum_{h \in C_1} w_{1h} = 1.$$

Let $w_{2h} > 0$ be a weight associated with each design cell $h \in C_2$ such that:

$$\sum_{h \in C_2} w_{2h} = 1$$

The following are quantities needed for comparing the two weighted averages of expectation satisfaction:
The following are quantities needed for comparing the two weighted averages of expectation satisfaction:

$$\hat{X}_{1hi} = \frac{\sum_{j=1}^{m} Z_{1hij}}{m_{1hi}} \text{ for each } h \in C_1 \text{ and } i = 1, \ldots, n_{1h}$$

$$\hat{X}_{2hi} = \frac{\sum_{j=1}^{m_{2hi}} Z_{2hij}}{m_{2hi}} \text{ for each } h \in C_2 \text{ and } i = 1, \ldots, n_{2h}$$

$$\mu_{1h} = \frac{\sum_{i=1}^{n_{1h}} \hat{X}_{1hi}}{n_{1h}} \text{ for each } h \in C_1$$

-continued $$\mu_{1h} = \frac{\sum_{i=1}^{n_{1h}} \hat{X}_{1hi}}{n_{1h}} \text{ for each } h \in C_2$$

$$s_{1h}^2 = \frac{\sum_{i=1}^{n_{1h}} (\hat{X}_{1hi} - \hat{\mu}_{1h})^2}{n_{1h} - 1} \text{ for each } h \in C_1$$

$$s_{2h}^2 = \frac{\sum_{i=1}^{n_{2h}} (\hat{X}_{2hi} - \hat{\mu}_{2h})^2}{n_{2h} - 1} \text{ for each } h \in C_2$$

$$\hat{\mu}_1 \sum_{h \in C_1} w_{1h} \hat{\mu}_{1h}$$

$$\hat{\mu}_2 = \sum_{h \in C_2} w_{2h} \hat{\mu}_{2h}$$

$$\hat{\sigma}_{\hat{\mu}_1}^2 = \sum_{h \in C_1} w_{1h}^2 \frac{s_{1h}^2}{n_{1h}}$$

$$\hat{\sigma}_{\hat{\mu}_2}^2 = \sum_{h \in C_2} w_{2h}^2 \frac{s_{2h}^2}{n_{2h}}$$

We see test statistics and confidence intervals for differences between two weighted averages of expected satisfaction. A test statistic for testing $H_o: \mu_1 - \mu_2 = \delta$ vs. $H_a: \mu_1 - \mu_2 \neq \delta$ at the $\alpha$ level of significance is as follows:

Reject $H_o$ if:

$$|z| = \left| \frac{(\hat{\mu}_1 - \hat{\mu}_2) - \delta}{\sqrt{\hat{\sigma}_{\hat{\mu}_1}^2 + \hat{\sigma}_{\hat{\mu}_2}^2}} \right| > z_{\alpha/2}$$

Test statistic for testing $H_o: \mu_1 - \mu_2 = \delta$ vs. $H_a: \mu_1 - \mu_2 > \delta$ at the $\alpha$ level of significance. Reject $H_o$ if:

$$z = \frac{(\hat{\mu}_1 - \hat{\mu}_2) - \delta}{\sqrt{\hat{\sigma}_{\hat{\mu}_1}^2 + \hat{\sigma}_{\hat{\mu}_2}^2}} > z_{\alpha}$$

A $(1-\alpha)$ confidence interval for $\mu_1 - \mu_2$:

$$P(\hat{\mu}_1 - \hat{\mu}_2 - z_{\alpha/2} \sqrt{\hat{\sigma}_{\hat{\mu}_1}^2 + \hat{\sigma}_{\hat{\mu}_2}^2} \leq \mu_1 - \mu_2 \leq \hat{\mu}_1 - \hat{\mu}_2 + z_{\alpha/2} \sqrt{\hat{\sigma}_{\hat{\mu}_1}^2 + \hat{\sigma}_{\hat{\mu}_2}^2}) = 1 - \alpha$$

Next we discuss text statistics and confidence intervals for true average within-basis variance under the 2-stage sampling theory. Let Z denote the satisfaction rating of the j-th sampled rater from the i-th sampled business, $i=1, \ldots, n$ and $j=1, \ldots, m_i$.

Let:

$$\hat{X}_i = \frac{1}{m_i} \sum_{j=1}^{m_i} Z_{ij} \text{ [sample within-business mean satisfaction]}$$

-continued $$\hat{Y}_i^3 = \frac{\sum_{j=1}^{m_i} (Z_{ij} - \hat{X}_i)^2}{m_i - 1} \text{ [sample within-business variance in satisfaction]}$$

$$\hat{\tau} = \frac{1}{n} \sum_{i=1}^{n} \hat{Y}_i^2 \text{ [sample average within-business variance]}$$

$$v^2 = \frac{\sum_{i=1}^{n} (\hat{Y}_i^2 - \hat{\tau})^2}{n - 1} \text{ [sample variance of within-business variance]}$$

Next is discussed single population tests on true average within-business variance. Test statistic for testing $H_o: \tau = \tau_0$ vs. $H_a: \tau \neq \tau_0$ at $\alpha$ level:

Reject $H_o$ if:

$$|z| = \left| \frac{\hat{\tau} - \tau_0}{\sqrt{v^2/n}} \right| > z_{\alpha/2}$$

where $z_{\alpha/2}$ is the value of a N (0,1) random variable z such that $P(z > z\alpha/2) = \alpha/2$.

The test statistic for testing $H_o: \tau = \tau_0$ vs. $H_a: \tau > \tau_0$ at $\alpha$ level of significance is as follows:

Reject $H_o$ if:

$$z = \frac{\hat{\tau} - \tau_0}{\sqrt{v^2/n}} > z_{\alpha}$$

where $z_{\alpha}$ is the value of a N(0,1) random variable z such that $P(z > z_{\alpha}) = \alpha$.

The confidence interval for $\tau$ is as follows: A $(1-\alpha)$ confidence interval for $\tau$ is given by $P(\hat{\tau} - z_{\alpha/2} \sqrt{v^2/n} \leq \tau \leq \hat{\tau} + z_{\alpha/2} \sqrt{v^2/n}) = 1 - \alpha$ where $z_{\alpha/2}$ is the value of a N(0,1) random variable z such that $P(z > z_{\alpha/2}) = \alpha/2$.

Next we compare expected within-business variance in two populations. Let $Z_{1ij}$ denote the satisfaction rating of the j-th sampled rater from the i-th sampled business in population 1, $i=1, \ldots, n1$ and $j=1, \ldots, m1i$. Let Z2ij denote the satisfaction rating of the j-th sampled rater from the i-th sampled business in population 2, $i=1, \ldots, n2$ and $j=1, \ldots, m2i$. Let:

$$\hat{X}_{1i} = \frac{1}{m_i} \sum_{j=1}^{m_i} Z_{1ij}$$

$$\hat{X}_{2i} = \frac{1}{m_{2i}} \sum_{j=1}^{m_i} Z_{2ij}$$

$$\hat{\mu}_1 = \frac{1}{n_1} \sum_{i=1}^{n_1} \hat{X}_{1i}$$

$$\hat{\mu}_2 = \frac{1}{n_2} \sum_{i=1}^{n_1} \hat{X}_{2i}$$

-continued $$s_1^2 = \frac{\sum_{i=1}^{n_1}(\hat{X}_{1i} - \hat{\mu}_1)^2}{n_1 - 1}$$

$$s_2^2 = \frac{\sum_{i=1}^{n_2}(\hat{X}_{2i} - \hat{\mu}_2)^2}{n_2 - 1}$$

The test statistics and confidence intervals for differences in expected within-business variance in two populations is discussed next. Test statistic for testing $H_o: \tau_1 - \tau_2 = \delta$ vs. $H_a: \tau_1 - \tau_2 \neq \delta$ at the $\alpha$ level of significance:

Reject $H_o$ if:

$$|z| = \left|\frac{(\hat{\tau}_1 - \hat{\tau}_2) - \delta}{\sqrt{v_1^2/n_1 + v_2^2/n_2}}\right| > z_{\alpha/2}$$

Test statistic for testing $H_o: \tau_1 - \tau_2 = \delta$ vs. $H_a: \tau_1 - \tau_2 > \delta$ at the $\delta$ level of significance is as follows:

Reject $H_o$ if:

$$z = \frac{(\hat{\tau}_1 - \hat{\tau}_2) - \delta}{\sqrt{v_1^2/n_1 + v_2^2/n_2}} > z_\alpha$$

A $(1-\alpha)$ confidence interval for $\tau_1 - \tau_2$ is as follows:

$$P(\hat{\tau}_1 - \hat{\tau}_2 - z_{\alpha/2}\sqrt{v_1^2/n_1 + v_2^2/n_2} \leq \tau_1 - \tau_2 \leq \hat{\tau}_1 - \hat{\tau}_2 + z_{\alpha/2}\sqrt{v_1^2/n_1 + v_2^2/n_2}) = 1-\alpha$$

Next we discuss multiple population designs, e.g. factorial designs. In these designs, we may want to test a hypothesis about a weighted average of some parameter of the satisfaction distribution over some subset of elementary design cells (populations) in a multiple population design. The weights used in combining populations/cells are problem-specific. Here, we will only assume that the weights are known constants that sum to one. It is also assumed that the cells represent mutually exclusive populations and that observations in each design cell are independent of observations in all other cells.

Let $Z_{hij}$ be the satisfaction score of the j-th sampled rater in the i-th sampled business within the h-th design cell (h-th subpopulation), $j=1, \ldots, m_{hi}$, $i=1, \ldots, n_h$, and $h=1, \ldots, q$.

Let:

$$\hat{X}_{hi} = \frac{\sum_{j=1}^{m_{hi}} Z_{hij}}{m_{hi}}$$

$$\hat{Y}_{hi}^2 = \frac{\sum_{j=1}^{m_{hi}}(Z_{hij} - \hat{X}_{hi})^2}{m_{hi} - 1}$$

$$\hat{\tau}_h = \frac{\sum_{i=1}^{n_h} \hat{Y}_{hi}^2}{n_h}$$

$$v_h^2 = \frac{\sum_{i=1}^{n}(\hat{Y}_{hi}^2 - \hat{\tau}_h)^2}{n_h - 1}$$

Tests on weighted expected within-businesses variances are discussed next. Let $w_h \geq 0$ denote the weight associated with subpopulation/design cell h, for $h=1, \ldots, q$, where $$\sum_{h=1}^{q} w_h = 1.$$

Let $$\hat{\tau} = \sum_{h=1}^{q} w_h \hat{\tau}_h \text{ and } \hat{\sigma}_{\hat{\tau}}^2 = \sum_{h=1}^{q} w_h^2 \frac{v_h^2}{n_h}$$

We discuss tests for hypotheses about $$\tau = E(\hat{\tau}) = \sum_{h=1}^{q} w_h E(\hat{\tau}_h) = \sum_{h=1}^{q} w_h \tau_h$$

The test statistic for testing $H_o: \tau = \tau_0$ vs. $H_a: \tau \neq \tau_0$ at $\alpha$ level of significance are as follows.

Reject $H_o$ if:

$$|z| = \left|\frac{\hat{\tau} - \tau_0}{\hat{\sigma}_{\hat{\tau}}}\right| > z_{\alpha/2}$$

The test statistic for testing $H_o: \tau = \mu_0$ vs. $H_a: \mu > \tau_0$ at $\alpha$ level of significance is as follows:

Reject $H_o$ if:

$$z = \frac{\hat{\tau} - \tau_0}{\hat{\sigma}_{\hat{\tau}}} > z_\alpha$$

The confidence interval for a weighted average of expected within-business variance is discussed next. A $(1-\alpha)$ confidence interval for $$\tau = E(\hat{\tau}) = \sum_{h=1}^{q} w_h E(\hat{\tau}_h) = \sum_{h=1}^{q} w_h \tau_h$$

is given by: $P(\hat{\tau} - z_{\alpha/2}\hat{\sigma}_{\hat{\tau}} \leq \tau \leq \hat{\tau} + z_{\alpha/2}\hat{\sigma}_{\hat{\tau}}) = 1-\alpha$ where $$\hat{\tau} = \sum_{h=1}^{q} w_h \hat{\tau}_h \text{ and } \hat{\sigma}_{\hat{\tau}}^2 = \sum_{h=1}^{q} w_h^2 \frac{v_h^2}{n_h}.$$

Next we discuss comparing two weighted averages of expected within-business variance. For example, one might want to compare expected weighted within-business variance in satisfaction with AT&T over all products and segments with expected weighted within-business variance in satisfaction over all competitors (Verizon, Bell South etc.), products and segments. Let $C_1$ and $C_2$ denote two subsets of elementary design cells that have no cells in common, i.e., $C_1 \cap C_2$ is empty. Let $Z_{1hij}$ be the satisfaction score of the j-th sampled rater in the i-th sampled business within the h-th design cell (h-th subpopulation), $j=1, \ldots, m_{1hi}$, $i=1, \ldots, n_{1h}$, and $h \in C_1$. Let $Z_{2hij}$ be the satisfaction score of the j-th sampled rater in the i-th sampled business within the h-th design cell (h-th subpopulation), $j=1, \ldots, m_{2hi}$, $i=1, \ldots, n_{2h}$, and $h \in C_2$.

Let $w_{1h} > 0$ be a weight associated with each design cell $h \in C_1$, such that $$\sum_{h \in C_1} w_{1h} = 1.$$ Let $w_{2h}$ be a weight associated with design cell $h$ for each $h \in C_2$, such that $\sum_{h \in C_2} w_{2h} = 1$.

The quantities needed for comparing the two weighted averages of expected within-business variance are as follows:

$$\hat{X}_{1hi} = \frac{\sum_{j=1}^{m_{1hi}} Z_{1hij}}{m_{1hi}} \text{ for each } h \in C_1 \text{ and } i = 1, \ldots, n_{1h}$$

$$\hat{X}_{2hi} = \frac{\sum_{j=1}^{m_{2hi}} Z_{2hij}}{m_{2hi}} \text{ for each } h \in C_2 \text{ and } i = 1, \ldots, n_{2h}$$

$$\hat{Y}_{1hi}^2 = \frac{\sum_{j=1}^{m_{1hi}} (Z_{1hij} - \hat{X}_{1hi})^2}{m_{1hi} - 1} \text{ for each } h \in C_1 \text{ and } i = 1, \ldots, n_{1h}$$

$$\hat{Y}_{2hi}^2 = \frac{\sum_{j=1}^{m_{2hi}} (Z_{2hij} - \hat{X}_{2hi})^2}{m_{2hi} - 1} \text{ for each } h \in C_2 \text{ and } i = 1, \ldots, n_{1h}$$

$$\hat{\tau}_{1h} = \frac{\sum_{i=1}^{n_{1h}} \hat{Y}_{1hi}^2}{n_{1h}} \text{ for each } h \in C_1$$

$$\hat{\tau}_{2h} = \frac{\sum_{i=1}^{n_{2h}} \hat{Y}_{21hi}^2}{n_{2h}} \text{ for each } h \in C_2$$

$$v_{1h}^2 = \frac{\sum_{i=1}^{n_{1h}} (\hat{Y}_{1hi}^2 - \hat{\tau}_{1h})^2}{n_{1h} - 1} \text{ for each } h \in C_1$$

$$v_{2h}^2 = \frac{\sum_{i=1}^{n_{2h}} (\hat{Y}_{2hi}^2 - \hat{\tau}_{2h})^2}{n_{2h} - 1} \text{ for each } h \in C_2$$

$$\hat{\tau}_1 = \sum_{h \in C_1} w_{1h} \hat{\tau}_{1h}$$

-continued $$\hat{\tau}_2 = \sum_{h \in C_2} w_{2h} \hat{\tau}_{2h}$$

$$\hat{\sigma}_{\hat{\tau}_1}^2 = \sum_{h \in C_1} w_{1h}^2 \frac{v_{1h}^2}{n_{1h}}$$

$$\hat{\sigma}_{\hat{\tau}_2}^2 = \sum_{h \in C_2} w_{2h}^2 \frac{v_{2h}^2}{n_{2h}}$$

Next is discussed text statistics and confidence intervals for differences in weighted expected within-business variance. The test statistic for testing $H_o: \tau_1 - \tau_2 = \delta$ vs. $H_a: \tau_1 - \tau_2 \neq \delta$ at the $\alpha$ level of significance is as follows:

Reject $H_o$ if:

$$|z| = \left| \frac{(\hat{\tau}_1 - \hat{\tau}_2) - \delta}{\sqrt{\hat{\sigma}_{\hat{\tau}_1}^2 + \hat{\sigma}_{\hat{\tau}_2}^2}} \right| > z_{\alpha/2}$$

The test statistic for testing $H_o: \tau_1 - \tau_2 = \delta$ vs. $H_a: \tau_1 - \tau_2 > \delta$ at the $\alpha$ level of significance is as follows:

Reject $H_o$ if:

$$z = \frac{(\hat{\tau}_1 - \hat{\tau}_2) - \delta}{\sqrt{\hat{\sigma}_{\hat{\tau}_2}^2 + \hat{\sigma}_{\hat{\tau}_2}^2}} > z_\alpha$$

A $(1-\alpha)$ confidence interval for $\tau_1 - \tau_2$ is as follows:

$$P\left(\hat{\tau}_1 - \hat{\tau}_2 - z_{\alpha/2}\sqrt{\hat{\sigma}_{\hat{\tau}_1}^2 + \hat{\sigma}_{\hat{\tau}_2}^2} \leq \tau_1 - \tau_2 \leq \hat{\tau}_1 - \hat{\tau}_2 + z_{\alpha/2}\sqrt{\hat{\sigma}_{\hat{\tau}_1}^2 + \hat{\sigma}_{\hat{\tau}_2}^2}\right) = 1 - \alpha$$

Next is discussed a more general form of the invention which is completely free of distributional assumptions and includes an additional optimization criterion. In particular, the generalization does not require the assumption stated above. An overview of this generalization is presented along with some key results.

Next are discussed distribution-free estimators of parameters in the generalized form of the invention. Let $Z_{ij}$ be a random variable representing the rating given by the jth sampled respondent, $j=1, \ldots, m_i$, from the ith sampled business/collective $B_i$, $i=1, \ldots, n$.

An estimator of $\mu$ is $$\hat{\mu} = \frac{1}{n} \sum_{i=1}^{n} \left( \frac{1}{m_i} \sum_{j=1}^{m_i} Z_{ij} \right). \quad (1)$$

An estimator of $\tau$ is $$\hat{\tau} = \frac{1}{n}\sum_{i=1}^{n}\left(\frac{1}{m_i}\sum_{j=1}^{m_i}Z_{ij}^2 - \binom{m_i}{2}^{-1}\sum_{j<k}^{m_i}Z_{ij}Z_{ik}\right). \quad (2)$$

An estimator of $\sigma^2$ is $$\hat{\sigma}^2 = \frac{1}{n}\sum_{i=1}^{n}\sum_{j<k}^{m_i}\binom{m_i}{2}^{-1}Z_{ij}^2 Z_{ik}^2 - \binom{n}{2}^{-1}\sum_{h<i}^{n}\left(\frac{1}{m_h}\sum_{h=1}^{m_h}Z_{hj}\right)\left(\frac{1}{m_i}\sum_{i=1}^{m_i}\right) \quad (3)$$

An estimator of $\hat{\theta}^2$ is $$\hat{\theta}^2 = \frac{1}{n}\sum_{i=1}^{n}\left[\binom{m_i}{2}^{-1}\sum_{r<s}^{m_i}Z_{ir}^2 Z_{is}^2 - \right. \quad (4)$$

$$2\binom{m_i}{3}^{-1}\sum_{r<s<t}^{m_i}Z_{ir}^2 Z_{is}Z_{it} + \binom{m_i}{4}^{-1}\sum_{r<s<t<u}^{m_i}Z_{ir}Z_{is}Z_{it}Z_{iu}\right] - $$

$$\binom{n}{2}^{-1}\sum_{h<i}^{n}\left[\left(\frac{1}{m_h}\sum_{j=1}^{m_h}Z_{hj}^2 - \binom{m_h}{2}^{-1}\sum_{j<k}^{m_h}Z_{hj}Z_{hk}\right)\right.$$

$$\left.\left(\frac{1}{m_i}\sum_{j=1}^{m_i}Z_{ij}^2 - \binom{m_i}{2}^{-1}\sum_{j<k}^{m_i}Z_{ij}Z_{ik}\right)\right]$$

The estimators shown in (1)-(4) are unbiased and distribution free. The estimators for $\mu$ and $\tau$ in (1) and (2), respectively, are equal to those shown in Table 1. The estimator for $\sigma^2$ in (3) is different from the estimator shown in Table 1. Although the estimator for $\sigma^2$ in Table 1 is distribution-free, the estimator for $\sigma^2$ in (4) is preferred because it is not only distribution-free but has smaller variance. The estimator for $\theta^2$ in (4) is distribution-free and is different from the estimator for $\theta^2$ shown in Table 1, which depends on the distributional assumption articulated above. Several additional unbiased distribution-free estimators are needed to implement the generalized invention.

An estimator of $\alpha = E[Y^2 + X^2)^2]$ is $$\hat{\alpha} = \frac{-1}{n}\sum_{i=1}^{n}\binom{m_i}{2}^{-1}\sum_{j<k}^{m_i}Z_{ij}^2 Z_{ik}^2. \quad (5)$$

An estimator of $\beta = E[(Y^2 + X^2)]$ is $$\hat{\beta} = \frac{1}{n}\sum_{i=1}^{n}\binom{m_i}{3}^{-1}\sum_{r<s<t}^{m_i}Z_{ir}^2 Z_{is}^2 Z_{it}. \quad (6)$$

An estimator of $\hat{\gamma} = E[X^3]$ is $$\hat{\gamma} = \frac{1}{n}\sum_{i=1}^{n}\binom{m_i}{3}^{-1}\sum_{r<s<t}^{m_i}Z_{ir}Z_{is}Z_{it}. \quad (7)$$

An estimator of $\hat{\delta} = E[X^4]$ is $$\hat{\delta} = \frac{1}{n}\sum_{i=1}^{n}\binom{m_i}{4}^{-1}\sum_{r<s<t<u}^{m_i}Z_{ir}Z_{is}Z_{it}Z_{iu}. \quad (8)$$

Next discussed is the optimal choice of m=number of observations to sample from each business/collective in the generalization of the invention. If the optimality criterion chosen is MINIMIZE VAR($\hat{\mu}$), then the generalized invention and the original invention are identical and give the same results: the optimal choice of m is m=1. If the optimality criterion chosen is ACHIEVE RELIBILITY R, them optimal m is given by $$m = \frac{\tau}{\sigma^2}\frac{R}{(1-R)},$$

the same general formula as in the original invention. However, because the estimator for $\sigma^2$ in the generalized invention is slightly different from the estimator for $\sigma^2$ in the original invention, the calculated value of optimal m may differ slightly from the value obtained in the original invention. A new choice of optimality criterion is introduced for the generalized invention: MINIMIZE VAR ($\hat{\sigma}^2$). The variance of $\hat{\sigma}^2$ in the generalized invention is given by (9)

$$\text{VAR}(\hat{\sigma}^2) = \frac{1}{S}\left[\frac{2}{(m-1)}\theta^2 + 4(\alpha - \delta) + m\delta + \right.$$

$$\left(\frac{2m^2}{(s-m)} - m\right)\sigma^4 + 6m\sigma^2\mu^2 - 8\mu(\beta - \gamma) - 4m\mu\gamma\right] +$$

$$\frac{1}{S}\left[\frac{2}{(m-1)} + \frac{2}{(S-m)}\right]\tau^2 + \frac{4m}{(S-m)}\tau\sigma^2 + 4\tau\mu^2 + 3m\mu^4\right], \text{ where}$$

where

S=mn=total sample size. For fixed S, the value of m that minimizes VAR($\hat{\sigma}^2$) is the unique root of the equation $$\frac{d\,\text{VAR}(\hat{\sigma}^2)}{dm} = 0$$

that lies strictly between 1 and S. This root can be found by applying any standard numerical method for finding the root(s) of an equation.

The numerical method implemented in the generalized invention is the Bisection algorithm (see for example Ralston, A. and Rabinowitz, P. 1978, *A First Course in Numerical Analysis*, $2^{nd}$ ed.(New York: McGraw Hill) section 8 . . . , or Press, W. H, Teukolsky, S. A., Vetterling, W. T. and Flannery, B. P. 1992, *Numerical Recipes in C*, $2^{nd}$ ed. (New York: Cambridge University Press) pp. 353-354, incorporated herein by reference). Applying this algorithm yields the optimal m for any fixed total sample size S. It is important to note that in the original invention the optimal choice of m is independent of total sample size S. However in the generalized invention the optimal value of m depends on S. Next discussed is the method for finding the minimum value of S (and its associated optimal m) that meets user-specified statistical precision requirements. Define a user-specified tolerance t>0 as the maximum absolute error allowed in estimating $\sigma^2$ at a used-specified level of confidence $(1-\alpha)$, i.e. $P[\sigma^2 - \hat{\sigma}^2| \leq t] \geq (1-\alpha)$. Let $z_{\alpha/2}$ denote the value of a standardized normal variate z such that $P(z > z_{\alpha/2}) = \alpha/2$, i.e., $z_{\alpha/2} = \Phi^{-1}(1-\alpha/2)$ where $\Phi^{-1}$ is inverse of the standard normal cumulative distribution functions Let m(S) be the optimal m for a given S. Then the S that meets the user-specified precision requirements, call it S*, (and its associated optimal m, say m*=m(S*)) is the root of the equation $F(S, m(S)) = var(\hat{\sigma}^2) - [t/z_{\alpha/2}]^2$. To find the root of F(S, m(S)), a preferred embodiment employs nested Bisection algorithms. On each iteration of the Bisection algorithm for S there is a trial value for S. Given the trial value of S, a Bisection algorithm is used to find m(S), the optimal m associated with the current trial value of S. If the current trial value of S and it associated m(S) are such that F(S, m(S))=0, i.e, S=S* and m(S)=m(S*)=m*, then cease iterating on S and the solution is n*=S*/m(S) and m*=m(S*). Otherwise continue to iterate on S. The method of nested Bisection algorithms is guaranteed to converge to a solution for n (the number of businesses/collectives to sample) and m (the number of respondents to sample from each business/collective) which meets the user-specified statistical precision requirements and which minimizes the variance of $\sigma^2$ (satisfies the chosen optimality criterion MINIMIZE VAR $(\hat{\sigma}^2)$). Next discussed is the solution for n* and m* when the chosen optimality criterion is MINIMIZE VAR $(\hat{\tau})$. The method for solution closely follows that used for the criterion MINIMIZE VAR $(\hat{\sigma}^2)$. A nested Bisection algorithm is applied to find the root of $F(S, m(S)) = var(\hat{\tau}) - [t/z_{\alpha/2}]^2$. For each trial value of S on a given iteration of the "outer" Bisection algorithm, an "inner" Bisection algorithm is executed to find the optimal value of m for the trial value of S. The optimal value of m for a given trial value of S is the root of the equation $$\frac{d\text{VAR}(\hat{\tau}^2)}{dm} = 0.$$

Next discussed is hypothesis testing and confidence and confidence interval construction in a generalized embodiment of the invention. The development closely follows that described above. There is no change required for tests and confidence intervals on $\mu$ for a single population or for comparisons of populations. For tests and confidence intervals on $\tau$ using the generalized invention, the estimate $v^2$ of the variance of $\hat{\mu}$ in each relevant design cell must be replaced by the expression for the distribution-free estimate variance of $\hat{\tau}$. Test and confidence intervals for parameter $\sigma^2$ in the generalized invention follow the equations used for tests and confidence intervals for $\tau$ with the following substitutions: (1) each occurrence of $\tau$ is replaced with $\sigma^2$; (2) each occurrence of $\hat{\tau}$ is replaced with $\hat{\sigma}^2$; (3) each occurrence of $v^2$ is replaced with the distribution-estimate of the variance of $\hat{\sigma}^2$.

Figure 8:
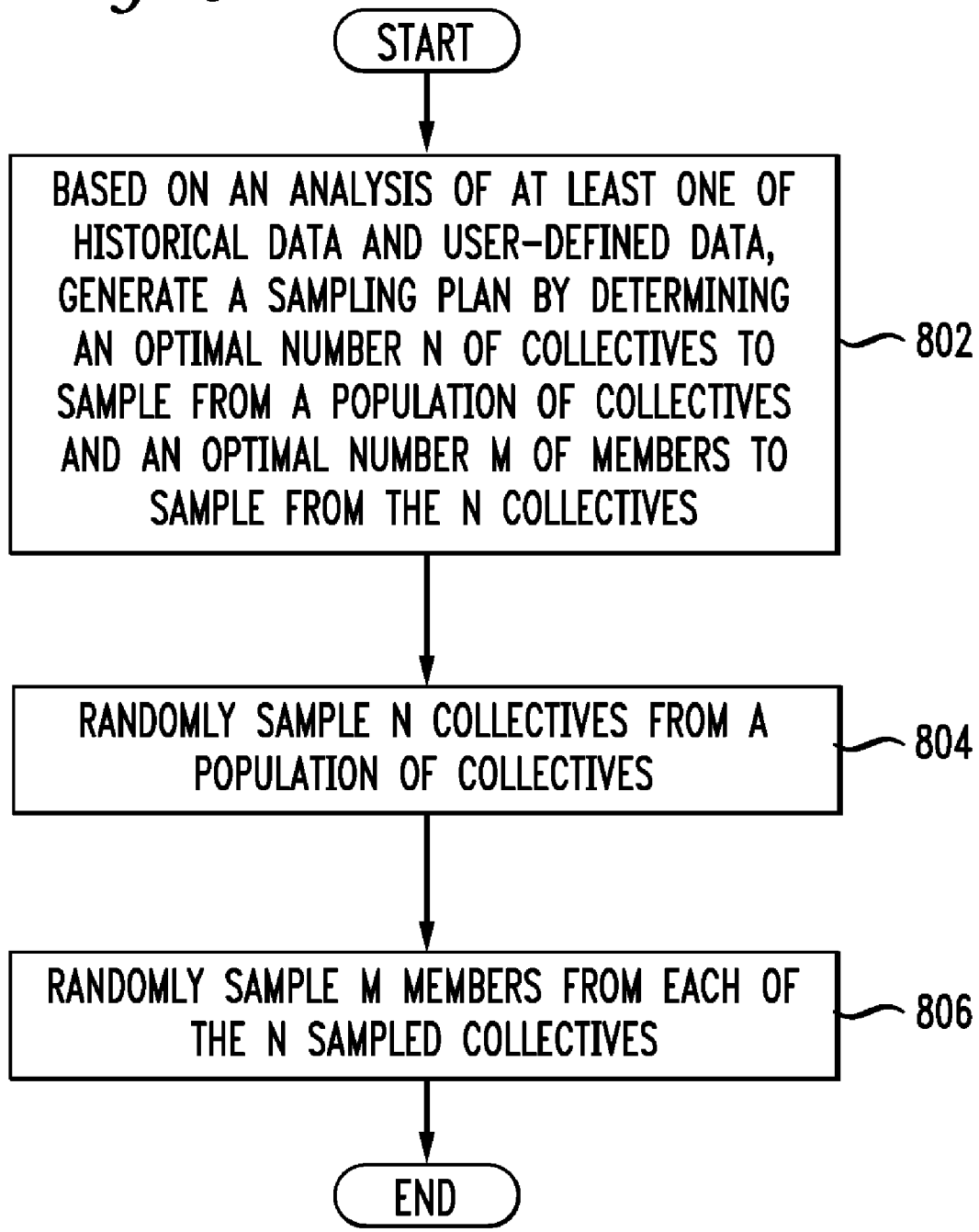
FIG. 8 illustrates a method embodiment of the invention.

FIG. 8 illustrates a method embodiment of the invention. For example, a method of generating a sampling plan on populations of collectives comprises, based on an analysis of at least one historical or pilot study data set and user-defined data, generating a sampling plan by determining an optimal number m of collectives to sample from a population of collectives and an optimal number n of members to sample from the m collectives (802), randomly sampling n collectives from a population of collectives (804) and randomly sampling m members from each randomly sampled n collective (806).

In addition to the efficient use of sample enabled by optimal sampling, a system operating on the principles of the invention performs parameter estimation, hypothesis testing and construction of confidence intervals in accordance with the new sampling theory. In general, the benefits of the invention are more efficient sampling, and richer, more valid statistical inference for market/opinion research on populations of collectives. Employment of this invention provides an improvement over current practice in many common market or opinion research studies, e.g. customer satisfaction studies.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, the historical parameter estimation module and optimal sampling planning module may be configured and used in desktop computing environment for design planning without including the remaining modules. Accordingly, the appended claims and their legal equivalents should only define the invention, rather than any specific examples given

I claim:

1. A method of generating a sampling plan on populations of collectives, the method causing a computing device to perform steps comprising:
    based on an analysis of at least one of historical data and user-defined data, generating a sampling plan by determining an optimal number n of collectives to sample from a population of collectives and an optimal number m of members to sample from the n collectives;
    randomly sampling n collectives from a population of collectives taking into account within-collective sampling error and between-collective sampling error; and
    randomly sampling m members from each randomly sampled n collective.

2. The method of claim 1, wherein generating the sampling plan is based at least in part on user-defined statistical precision requirements.

3. The method of claim 1, wherein randomly sampling collectives and randomly sampling members are performed on each elementary design cell in an overall sampling design.

4. The method of claim 1, wherein the analysis of the randomly sampled collectives and members comprises applying statistical procedures comprising at least one of parameter estimation, hypothesis testing, and construction of confidence intervals.

5. The method of claim 1, further causing the computing device to perform steps comprising:
    sampling the population of collectives by implementing the sampling plan.

6. The method of claim 5, wherein sampling the population comprises randomly sampling n collectives and m members of each n collectives.

7. The method of claim 1, further comprising generating the sampling plan based at least in part on historical data from at least one of previous surveys or pilot studies.

8. The method of claim 5, wherein sampling the population further comprises over-sampling to compensate for anticipated non-response rates.

9. The method of claim 1, wherein the user-defined data is at least one of an optimization criteria and statistical precision requirements.

* * * * *